US 7,801,808 B1

(12) United States Patent
Mattison et al.

(10) Patent No.: US 7,801,808 B1
(45) Date of Patent: Sep. 21, 2010

(54) DATABASE STRUCTURE FOR FINANCIAL PRODUCTS WITH UNIQUE, CONSISTENT IDENTIFIER FOR PARTIES THAT ASSUME ROLES WITH RESPECT TO THE PRODUCTS AND METHODS OF USING THE DATABASE STRUCTURE

(75) Inventors: Michele Mattison, Monroe, NY (US);
Michael Perlman, Lincroft, NJ (US);
David A. Gray, Upper Montclair, NJ (US); Dmitriy Holsten, New York, NY (US)

(73) Assignee: Morgan Stanley, New York, NY (US)

( * ) Notice: Subject to any disclaimer, the term of this patent is extended or adjusted under 35 U.S.C. 154(b) by 564 days.

(21) Appl. No.: 11/089,481

(22) Filed: Mar. 24, 2005

(51) Int. Cl.
*G06Q 00/40* (2006.01)
(52) U.S. Cl. .............................. 705/38; 705/26; 705/35; 705/37; 705/39
(58) Field of Classification Search ...................... 705/1, 705/35–45, 65; 707/1, 10; 735/35
See application file for complete search history.

(56) References Cited

U.S. PATENT DOCUMENTS

| 5,649,116 | A | | 7/1997 | McCoy et al. | |
| 5,819,263 | A | | 10/1998 | Bromley et al. | |
| 5,953,710 | A | | 9/1999 | Fleming | |
| 5,978,779 | A | * | 11/1999 | Stein et al. | 705/37 |
| 6,026,382 | A | * | 2/2000 | Kalthoff | 705/35 |

(Continued)

FOREIGN PATENT DOCUMENTS

| JP | 11-053450 A | | 2/1999 |
| WO | WO98/09209 | * | 3/1998 |
| WO | WO 99/27477 A1 | | 6/1999 |

(Continued)

OTHER PUBLICATIONS

Dun & Bradstreet Posts 7 Percent Growth in Third-Quarter Net Income to $63.4 Million, Excluding Gain on Sale of Moody's FIS Unit, Compared with Pro Forma 1997 Results. Business Wire, p. 1609. Oct. 21, 1998.*

(Continued)

*Primary Examiner*—Charles R Kyle
*Assistant Examiner*—Robert R Niquette
(74) *Attorney, Agent, or Firm*—K&L Gates LLP (57) ABSTRACT

The present invention is directed, in various embodiments, to a computer system comprising a party database and a products-role database. The party database contains party data records that contain information about various parties, respectively. The products-role database contains a number of product-role records. Each of the product-role records is associated with a different financial product. Further, each of the product-role records contains a unique party identifier for each party that performs a role for the corresponding financial product (such as issuer, guarantor, custodian, etc.) and a corresponding link to a party data record in the party database for each party, The party identifier is used consistently throughout the records of the products-role database to identify the corresponding party for all products where the party performs a role. The party data records may include hierarchical party relationship information for the party, such as identifying the legal parent, the credit parent, the ultimate legal parent and/or the ultimate credit parent of the party. In that way, the database arrangement can be used by a firm to measure its exposure to a particular party.

7 Claims, 6 Drawing Sheets

U.S. PATENT DOCUMENTS

| | | | |
|---|---|---|---|
| 6,058,375 | A | 5/2000 | Park |
| 6,119,103 | A | 9/2000 | Basch et al. |
| 6,128,602 | A | 10/2000 | Northington et al. |
| 6,327,573 | B1 | 12/2001 | Walker et al. |
| 6,349,291 | B1 | 2/2002 | Varma |
| 6,460,027 | B1 | 10/2002 | Cochrane et al. |
| 6,606,606 | B2 | 8/2003 | Starr |
| 6,636,833 | B1 | 10/2003 | Flitcroft et al. |
| 7,072,934 | B2 | 7/2006 | Helgeson et al. |
| 7,349,868 | B2 * | 3/2008 | Tenorio .................. 705/26 |
| 7,356,497 | B1 | 4/2008 | Bursey et al. |
| 7,370,011 | B2 | 5/2008 | Bennett et al. |
| 7,685,060 | B2 | 3/2010 | Casper et al. |
| 2002/0046053 | A1 | 4/2002 | Hare et al. |
| 2002/0116304 | A1 | 8/2002 | Casper et al. |
| 2003/0036997 | A1 * | 2/2003 | Dunne ................... 705/39 |
| 2003/0065613 | A1 * | 4/2003 | Smith .................... 705/38 |
| 2003/0078864 | A1 * | 4/2003 | Hardesty et al. ......... 705/35 |
| 2003/0093366 | A1 * | 5/2003 | Halper et al. ........... 705/38 |
| 2003/0177092 | A1 * | 9/2003 | Paglin ................... 705/42 |
| 2003/0187765 | A1 * | 10/2003 | Sgaraglio ............... 705/35 |
| 2003/0195868 | A1 * | 10/2003 | Wilson et al. ........... 707/3 |
| 2004/0006540 | A2 * | 1/2004 | Paglin ................... 705/42 |
| 2004/0073444 | A1 * | 4/2004 | Peh et al. ................ 705/1 |
| 2004/0083183 | A1 * | 4/2004 | Hardesty et al. ......... 705/65 |
| 2004/0107161 | A1 * | 6/2004 | Tanaka et al. ........... 705/38 |
| 2004/0122756 | A1 * | 6/2004 | Creeden et al. .......... 705/35 |
| 2005/0010513 | A1 | 1/2005 | Duckworth et al. |
| 2005/0114244 | A1 * | 5/2005 | Miri et al. .............. 705/35 |
| 2005/0125341 | A1 * | 6/2005 | Miri et al. .............. 705/39 |
| 2006/0080216 | A1 * | 4/2006 | Hausman et al. ......... 705/37 |
| 2007/0136188 | A1 | 6/2007 | Casper |

OTHER PUBLICATIONS

"Standard & Poor's, D&B, & Telekurs Establish Premier Entity Exposure Solution," *PR Newswire*, Jun. 16, 2003.

Pallay, J., "It's a Family Affair—If you think your family tree is confusing, check out the data hierarchies being built in Wall Street's data departments," *Wall Street & Technology*, Apr. 1, 2004.

"The McGraw-Hill Companies at UBS Warburg 31st Annual Media Week Conference—Final," *FD (Fair Disclosure) Wire*, Dec. 9, 2003.

\* cited by examiner

DATABASE STRUCTURE FOR FINANCIAL PRODUCTS WITH UNIQUE, CONSISTENT IDENTIFIER FOR PARTIES THAT ASSUME ROLES WITH RESPECT TO THE PRODUCTS AND METHODS OF USING THE DATABASE STRUCTURE

BACKGROUND

1. Field of Invention

The present invention generally concerns databases and, more particularly, a database structure that identifies the parties that perform roles with respect to financial products.

2. Background of the Invention

An "issuer" is a legal entity (party) that has the power to issue and distribute a financial product, such as an equity security (e.g., common stock) or a debt security (e.g., a bond or note). Issuers can include corporations, municipalities, foreign and domestic governments and their agencies, and investment trusts. Issuers of stock are responsible for reporting on corporate developments to shareholders and paying dividends once declared. Issuers of bonds are committed to make timely payments of interest and principal to bondholders.

A "guarantor" of a security (typically a bond or other type of debt security) is a legal entity that guarantees an obligation of another party. For example, a guarantor may guarantee the interest and/or principal payments on bonds issued by an issuer. If the issuer cannot fulfill its payment obligations, the guarantor is required to fulfill the guaranteed payment obligations.

A "custodian" is a legal entity, such as an agent, bank, trust company, or other organization, that holds and safeguards the assets of another. For example, a mutual fund custodian may hold and safeguard the securities held by a mutual fund.

Some financial institutions, such as investment banks and/or brokerage houses, often endeavor to track the issuers of financial products, particularly the issuers of financial products owned by the firm. Data regarding such products is typically commercially available from product data vendors such as Bloomberg, Thompson and EJV. This data typically includes a numerical identifier for the product (such as the CUSIP ID), a textual description of the product, and the name of the issuer. This data, however, is often unreliable because the product data vendors often have incomplete or inaccurate issuer information, For example, different names may be used to identify a single entity, making it difficult to track all the products for which that entity was the issuer.

To address this deficiency, systems have been developed that assign unique identifiers to the issuing parties in a database of product/issuer data. One such system is known as "Security to Entity CrossWalk," a joint venture from Standard & Poors, Dun & Bradstreet, and Telekurs Financial. Such systems facilitate tracking of exposure information. However, even with such systems it is difficult for a financial institution to determine its overall credit risk to a particular party. An accurate measure of the overall credit risk to a particular party cannot be measured based on issuer data alone where parties may assumes a variety of risk-exposing roles. Accordingly, there exists a need for a mechanism to track and utilize risk-exposing roles assumed by parties in respect of financial products.

SUMMARY

In one general aspect, the present invention is directed to a computer system comprising a party database and a products-role database. The party database contains party data records, where each record contains information about a separate party. The products-role database contains a number of product-roles records. Each of the product-roles records is associated with a different financial product. Further, each of the product-roles records contains a unique party identifier for each party that performs a role for the corresponding financial product, such as issuer, guarantor, custodian, etc., that is unique to the party and a corresponding link to a party data record in the party database. In addition, the party identifier is used consistently throughout the records of the products-role database to identify the corresponding party for all products where the party performs a role.

In various implementations, the party data records include hierarchical party relationship information for the party, such as identifying the legal parent, the credit parent, the ultimate legal parent and/or ultimate credit parent of the party. In that way, the database arrangement can be used by a firm to measure its exposure to a particular party. For example, based on the links for the issuer and/or guarantor (or other credit-linked entities listed in the records of the products-role database) to the corresponding party data records in the party database, the ultimate legal parent or ultimate credit parent for the various role-players for the products may be determined. The total exposure of the firm to the ultimate credit parents for the products may then be summed, or "rolled-up", to measure the credit exposure of the firm to those parties. Also, in a related manner, the cumulative exposure to a party can be compared to a trading limit for the party imposed by the firm. In that way, the firm can identify instances when its positions exceed its limits.

These and other benefits of the present invention will be apparent from the description to follow.

DESCRIPTION OF THE FIGURES

Various embodiments of the present invention are described herein by way of example in conjunction with the following figures, wherein.

DETAILED DESCRIPTION

Figure 1:
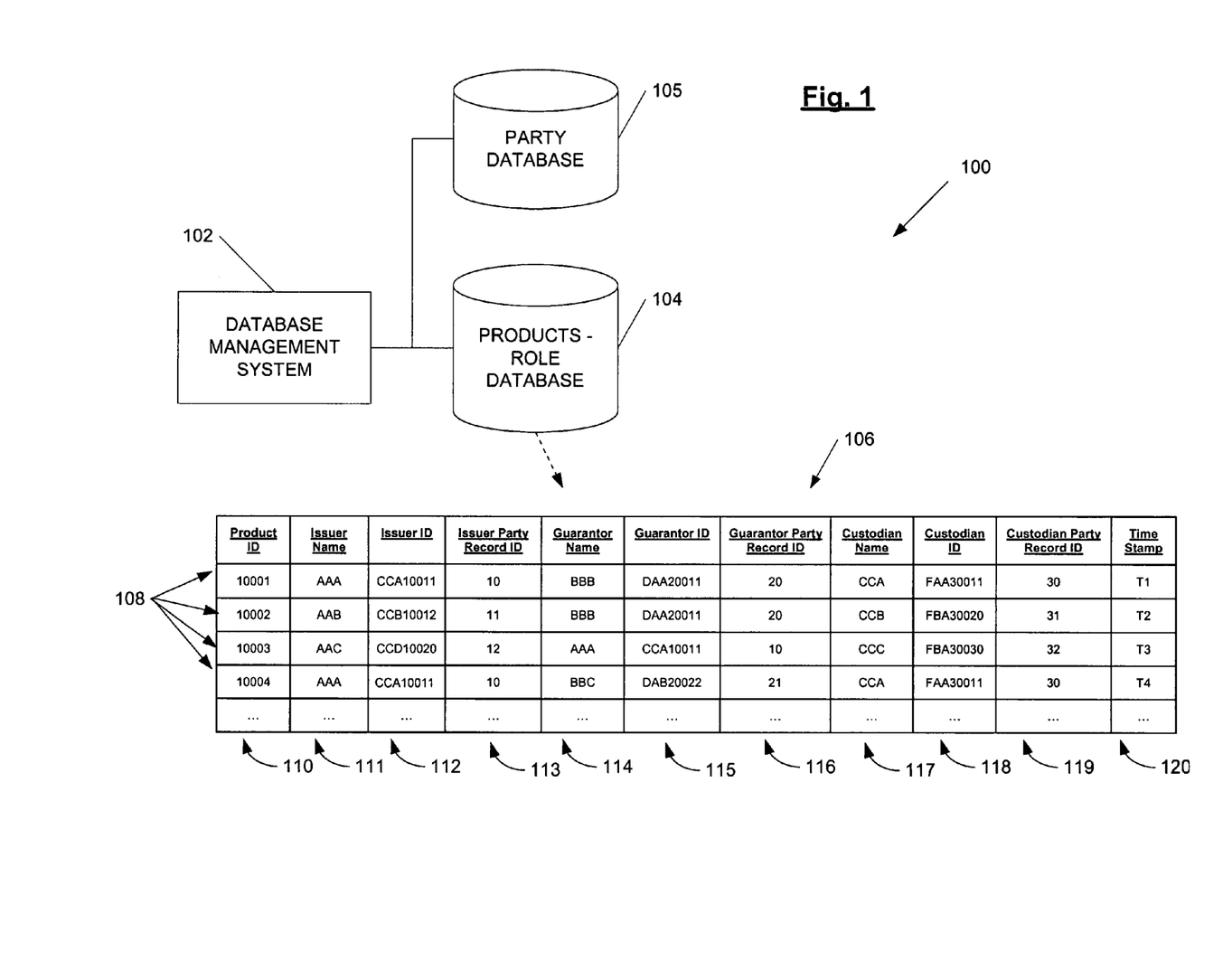
FIG. 1 is a diagram of a computer system according to various embodiments of the present invention.

FIG. 1 is a diagram of a computer system 100 according to various embodiments of the present invention. The system 100 includes a database management system 102, a products-role database 104, and a party database 105. The system 100 may be used, for example, by a financial institution, such as an investment bank and/or brokerage house (referred to hereinafter as "the firm"), or other types of entities in order to, for example, calculate or manage risk exposure, as will be apparent from the description to follow.

Figure 2:
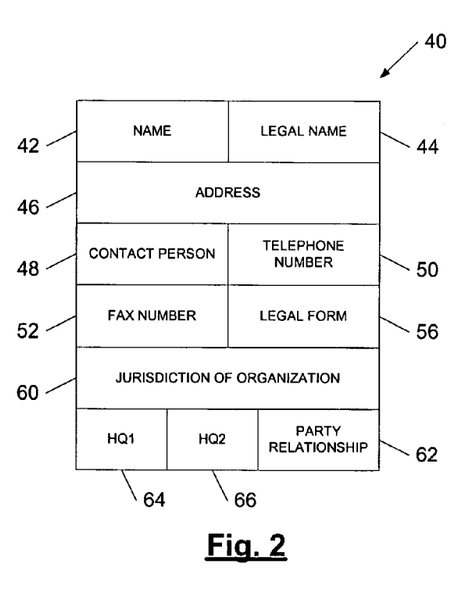
FIG. 2 is a diagram of a record for the party database according to various embodiments of the present invention.

The party database 105 may contain numerous party data records that each includes detailed information about a party. FIG. 2 is a diagram of a party data record 40 of the party database 105 according to various embodiments of the present invention. As shown in FIG. 2, the party data record 40 may include numerous fields for storing information about one party. For example, each record 40 may include fields for the party's name 42, the party's legal name 44, address 46, contact person 48, telephone number 50, fax number 52, legal form 56, and jurisdiction of organization 60 (if the party is a legal entity). Other fields may also be included in the records.

Each party data record 40 may also include fields that show relationships to other parties having records in the party database 105. For example, each party data record 40 may include a party relationship field 62 that facilitates the creation of certain relationships between different parties.

Figure 3A:
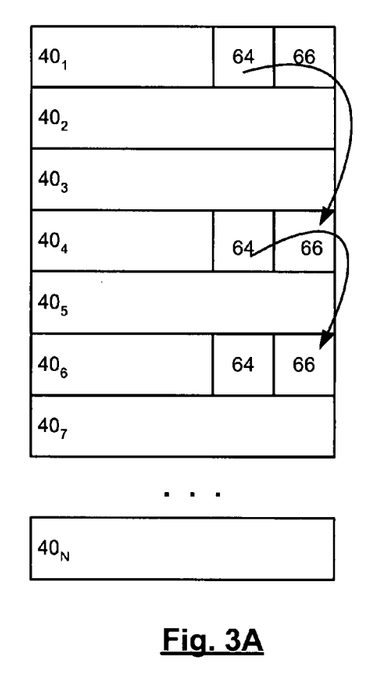
FIGS. 3A and 3B are diagrams illustrating links that show a hierarchical relationship between records of the party database.
Figure 3B:
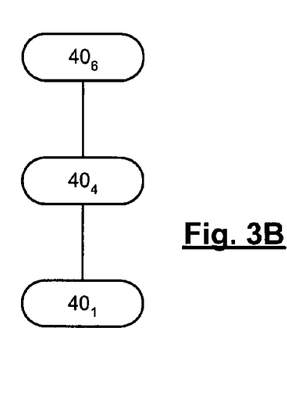

In addition, as shown in FIG. 2, the party data record 40 may include hierarchical relationship fields 64, 66 for identifying parties that are related in a hierarchical structure. The first hierarchical field 64 may contain a link to a parent entity of the party, and the second hierarchical field 66 may contain a link to a subsidiary entity. For example, as shown in FIG. 3A, where a first party is a subsidiary of a second party, the field 64 of the record 40$_1$ for the first party may contain a link to the field 66 of the party data record 40$_4$ for the parent second party. Also, if the second party is a subsidiary of another party, the fields 64 for the second party may contain a link to the field 66 of the party data record 40$_6$ for its parent, as shown in FIG. 3A. For the example of FIG. 3A, the resulting hierarchical relationship between the three parties is as shown in FIG. 3B. Other hierarchical relationships and other structures for identifying hierarchical relationships may also be used. More details about such a party database 105 may be found in U.S. Patent Application Publication 2002/0116304 A1, which is incorporated herein by reference. Use of hierarchical relationship information makes it possible to determine the legal parent, the credit parent, the ultimate legal parent and/or the ultimate credit parent of a party. As used herein, the term "ultimate credit parent" is used to denote an entity that is ultimately responsible for the debts of a party.

Returning to FIG. 1, the products-role database 104 may contain one or more files, such as file 106, that contain records 108 about the role players for various financial products. The financial products may be, for example, debt products, such as bonds or notes, or equity products, such as stock, or convertible instruments. The records 108 in the file 106 may contain fields that identify, among other things: the product ID (field 110), the issuer name (field 111), the issuer ID (field 112); the record ID for the issuer in the party database (field 113); the guarantor name (field 114); the guarantor ID (field 115); the record ID for the guarantor in the party database (field 116); the custodian name (field 117); the custodian ID (field 118); the record ID for the custodian in the party database (field 119); and a date/time stamp (field 120). For other financial products, the attributes of the file 106 can be tailored to the specific product as appropriate. Also, although not shown in FIG. 1, another applicable role-player may be a credit-linked entity, i.e., a party or entity that in some other way is credit-linked to the product. In that case, the file could additionally include the attributes for such a party (e.g., the name of the party, the ID for the party, and the corresponding record ID for the party in the party database 105).

The value for the products in the products field 110 may be alphanumeric identifiers for the products. For example, the product identifier may be the CUSIP number for the product, or some other identifier that is related to the CUSIP number. The CUSIP number (sometimes referred to herein merely as "CUSIP") is a number (typically nine characters) that uniquely identifies a particular security. CUSIP is an acronym for the Committee on Uniform Securities and Identification Procedures, the standards body that created and maintains the classification system. Other product classification systems may also be used, such as, for example, the CINS number, a number for classifying foreign securities. Also, a firm's internal proprietary product classification system may be used to identify the products.

The values for the role-player fields 111-119 may identify the parties who assume the various roles for the particular product. In particular, the various party record ID fields (i.e., fields 113, 116, 119) may contain links to corresponding party data records for the respective parties in the party database 105. Also, each particular party may have its own unique identifier that is used consistently for all of the records in the database 104. That is, a particular party will have the same unique ID (fields 112, 115, 118) and the same unique party record ID (e.g., fields 113, 116, 119) throughout the file 106. For example, with reference to the example of FIG. 1, products 10001 and 10004 have the same issuer (party AAA). Also in this example, the issuer for products 10001 and 10004 is the guarantor for product 10003 (party AAA). Similarly, the same party (party CCA) is the custodian for products 10001 and 10004. In other embodiments, the ID (e.g., fields 112, 115, 118) may contain an embedded link to the party record ID.

According to various embodiments, the system 100 may include one products-role database 104, or the products-role database 104 may be segmented into a number of sub-files or sub-databases. For example, the products-role database 104 may include one database for equity products and another database for debt products.

The database management system (DBMS) 102 may control the organization, storage and retrieval of data from the databases 104, 105 for many users of the system. The DBMS 102 may also control the security of the databases 104, 105. The DBMS 102 may be implemented as a computer device or network that executes database management software.

By using unique, consistent identifiers for each party in the products-role database 104, and by having links to detailed information about the parties in the party database 105, including information about the legal parent and/or ultimate credit parent of the parties, and by tracking other role players for a product, particularly guarantor for debt products, a firm may have increased capability to measure its credit exposure to a particular entity with the system of the present invention. For example, in the past, if a parent entity had three separate subsidiaries issue debt products, it would be difficult for a firm owning the products to measure its credit exposure to the parent entity because the issuer product information would only list the subsidiaries as the issuers. Further, if the products were guaranteed by other parties, this information would not easily or reliably be available to the firm.

On the other hand, with the system 100 of FIG. 1, the firm could measure its credit exposure to parties, including, for example, the ultimate legal parent and/or ultimate credit parent of the issuing subsidiary parties. That is because for each issuer, the products-role database 104 will contain a link to the party record for the issuer, and the party record information will include the hierarchical relationships of the issuer. Further, the firm could enhance it credit exposure analysis by including, as appropriate, products where the parties assume other credit-exposing roles, such as guarantor for a debt product. For instance, for the example of FIG. 1, if the firm owned the listed products, it could determine that it has credit exposure to the party identified by the ID's DAA20011, CCA10011 and DAB20022, because those parties are the guarantors of the listed products. Further, by linkage to the party database records in the party database 105, the firm could measure its credit exposure to, for example, the ultimate legal parent and/or ultimate credit parent (if any) of those parties.

A related use for such a system is in enforcing position or trading limits on particular parties. For example, with the system 100 of FIG. 1, a firm can put trading limits on a primary party, and the exposure of the firm to the primary party can include all of the credit exposure to subsidiary/related parties, dependent on the role of the subsidiary/related parties of the primary party where the primary party is the ultimate legal parent or ultimate credit parent of the subsidiary/related parties. The cumulative exposure to the primary party can then be compared to the trading limit. The limits may be, for example, single name limits on parties (such as a limit of $X for all parties meeting certain criteria), or cumulative limits on groups of parties (such as a limit of $Y on all products guaranteed by the government of a particular country, etc.).

Figure 4:
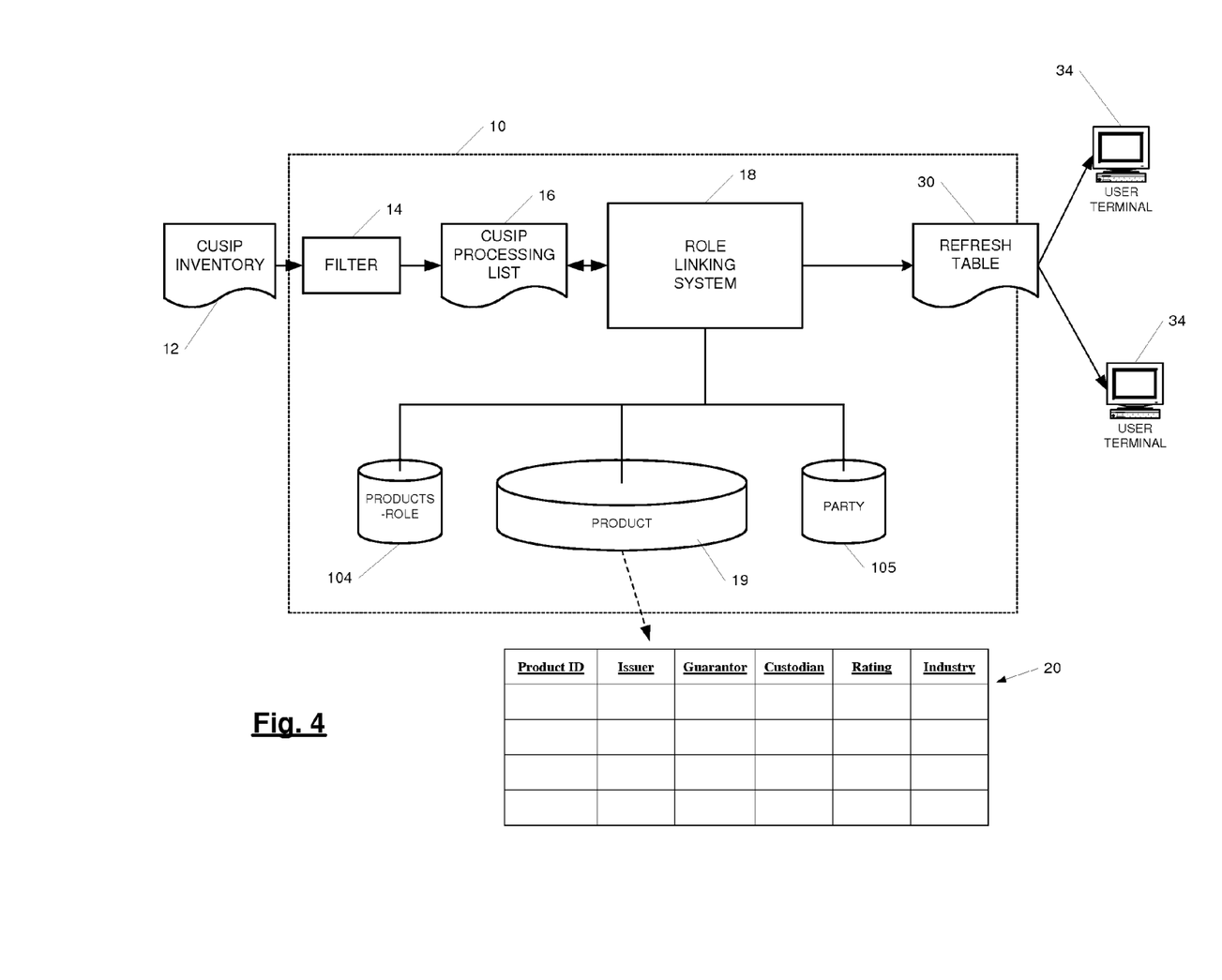
FIG. 4 is a diagram of a role linking system for linking records in the party database to the role players associated with financial products according to various embodiments of the present invention.

The following describes a system 10, shown in FIG. 4, for linking the roles played by parties with respect to financial products to records in the party database 105. As shown in FIG. 4, the system 10 may receive a CUSIP inventory file 12 (or a file from another identifier system) that lists the identifiers (e.g., CUSIP) for certain financial products. For example, the CUSIP inventory file 12 may list all securities held by the firm. The CUSIP inventory file 12 may be generated and sent to the system 10 on a periodic basis, such as daily. A filter module 14 may filter the CUSIP inventory file 12 to remove, for example, certain types of products, such as products that do not have direct issuer or guarantor risk based on the security type. For example, foreign exchanges (FX), commodities, futures contracts, forward contracts, swap contracts, etc., may be removed from the CUSIP inventory file 12.

All unique, filtered positions from the filter process may be contained in a CUSIP processing list file 16. The CUSIP processing list file 16 may contain, among other things, the following attributes: CUSIP, issue ID (e.g., a firm's internal product identifier, product description, security type code, Issuer status, Guarantor status, Custodian status, date processed, data received, issuer ID, guarantor ID, and custodian ID. The first four of these attributes (i.e., CUSIP, issue ID, product description, security type code) may be populated with data from the CUSIP inventory file 12. The data for the other attributes may be populated at differing points along the linking process of the system 10, as described in more detail below.

A role linking system 18 may then perform the operation of linking the names of parties assuming or fulfilling various roles with respect to the securities product, as stored in a products database 19 to more detailed data records about the parties in the party database 105. Those links are stored in the records 108 of the products-role database 104. The problem with the data in the products database 19 is, as described above, the party information is often inaccurate, incomplete and/or inconsistent. For example, a number of different names may be used to identify a single party. Accordingly, based on the linking operation, the role linking system 18 may populate the fields of the records of the products-role database 104 such that unique identifier are used consistently in the records 18 of the products-role database 104 to identify respective parties. The role linking system 108 may be implemented as one or more networked computer devices programmed to perform the functions described herein.

According to various embodiments, the products database 19 may include records 20, such as shown in FIG. 4, that contain a product ID (e.g., CUSIP ID), and the names of the issuer, guarantor and custodian, if available. The records 20 may also contain a rating for the product (particularly for debt products) and an identifier of the industry for the product. Also, if available, the records 20 may contain the names of additional role players (e.g., an otherwise credit-linked entity) related to the products besides those mentioned above. The data for the products database 19 may be obtained, for example, from product data vendors or any other reliable source. The problem with the products database 19, as mentioned before, is that the party names may not be accurate or complete. In various embodiments, the products database 19 may include a number of sub-files or sub-databases, such as one sub-file or sub-database for equity products and another sub-file or sub-database for debt products.

If the role linking system 18 is able to make a link between a party performing a role (e.g., issuer, guarantor, custodian) with respect to a product and a party record in the party database 105, then the role linking system 18 may update the relevant status field in the CUSIP processing list file 16 to show that a link has been established. For example, using codes described in more detail below, the role linking system 18 may update the Issuer status field of the CUSIP processing list file 16 when a link to a party record has been made for the issuer of the product. Similarly, the role linking system 18 may update the Guarantor status field and/or the Custodian status field of the CUSIP processing list file 16 when a link to a party record has been made for the guarantor and/or custodian of the product, respectively.

In order to correctly and accurately identify the relevant parties, the role linking system 18 links the identified issuer and/or guarantor and/or custodian to party records stored in the party database 105 that contain more detailed information about the parties. The established links between the issuer/guarantor/custodian and the party data may be stored in the products-role database 104. That is, the products-role database 104, as discussed above, may contain links (e.g., fields 113, 116 and 119 in FIG. 1) between party IDs (e.g., fields 112, 115, 118 in FIG. 1) for the products from the products database system 19 and the corresponding party record in the party database 105.

Also, based on the linking operation, the role linking system 18 may periodically (such as daily, for example) publish a daily refresh table (DRT) 30. The DRT 30 may include a cross-reference table linking product, role (e.g., issuer, guarantor, custodian), and party. The DRT 30 may further include the relevant role data from the products database 19 for the product, the party data for the various role players from the party database 105, as well as ratings/industry data (such as credit ratings). The DRT 30 may be published to end users of the system 10, such as end-users at terminals 34.

As mentioned above, the role linking system 18 may update fields in the CUSIP processing list file 16 to indicate the status of the linking operation for the various role players. According to various embodiments, the following role player status codes may be used:

| Code | Status | Description |
|---|---|---|
| 1 | Linked | Issuer/Guarantor/Custodian ID to Party DB ID link established |
| 2 | Unknown | Work item created, reviewed and unable to link |
| 3 | Reprocess | Issuer/Guarantor/Custodian data has changed in the source system requiring a new link to be created |

-continued

| Code | Status | Description |
|---|---|---|
| 4 | Arbitration | Fuzzy Match has returned multiple matches. Work item created |
| 5 | New | Identifies new product that must be linked. |
| 6 | Issuer/Guarantor/Custodian Found | Issuer/Guarantor/Custodian data exists in database for given product identifier |
| 7 | Issuer/Guarantor/Custodian Not Found, Product Found | No Issuer/Guarantor/Custodian data found in database for given product identifier |
| 8 | Linked, No Issuer/Guarantor/Custodian Found | Product linked from scrubbed product description |
| 9 | No Product Found | No product match found in Issuer/Guarantor/Custodian database for given product identifier |
| 10 | Invalid Product for Linking | Product does not meet requirements for linking |
| 11 | Arbitration - No Match found | Fuzzy Match has returned no matches. Work item created. |
| 12 | Need for Issuer/Guarantor/Custodian Data | Work item created, reviewed and unable to link due to incomplete supporting Issuer/Guarantor/Custodian data |
| 13 | Issuer/Guarantor/Custodian Unknown | Work item created, reviewed and unable to link due to missing Issuer/Guarantor/Custodian data. |

Figure 5:
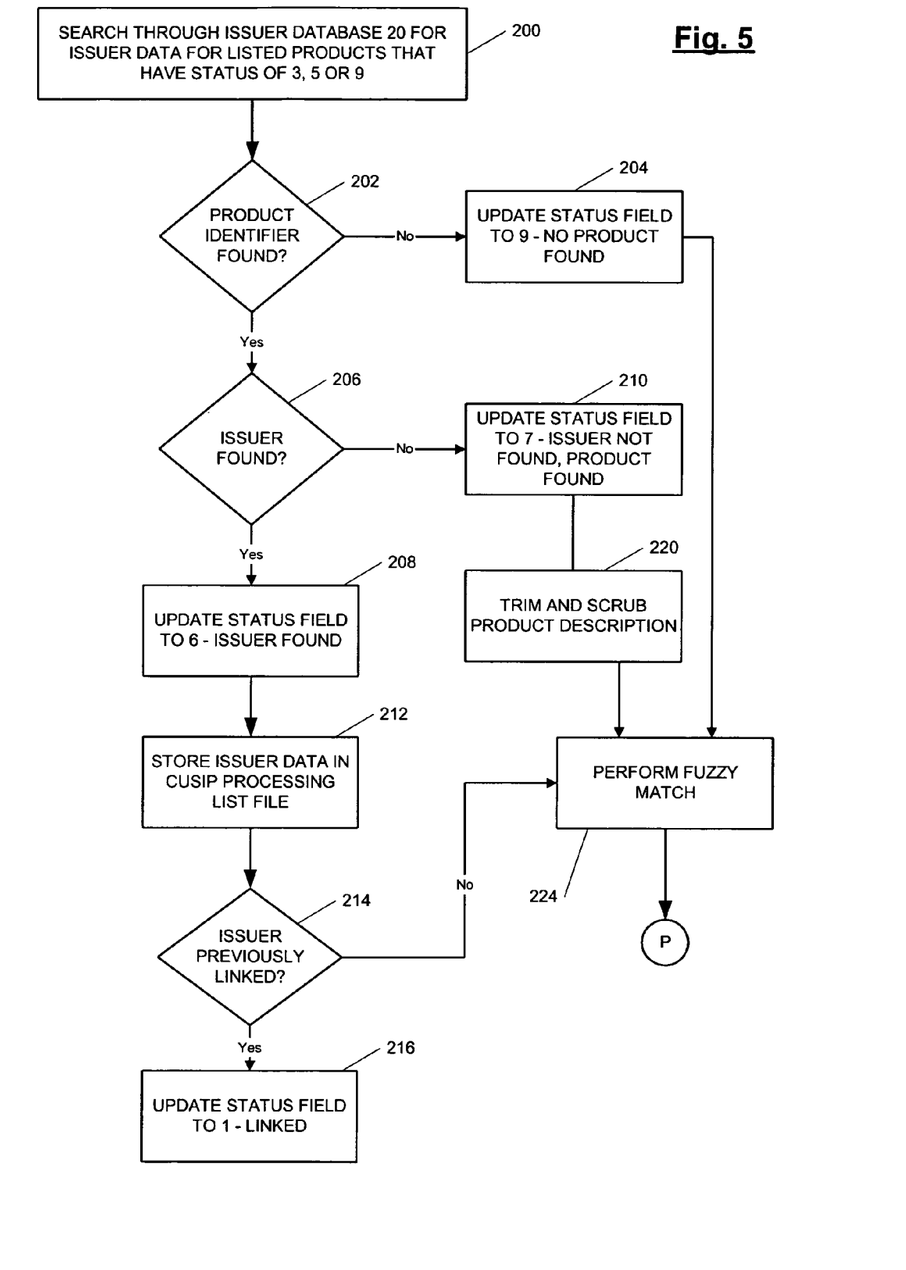
FIGS. 5 and 6 provide a flowchart of the process flow through the role linking system according to various embodiments of the present invention.
Figure 6:
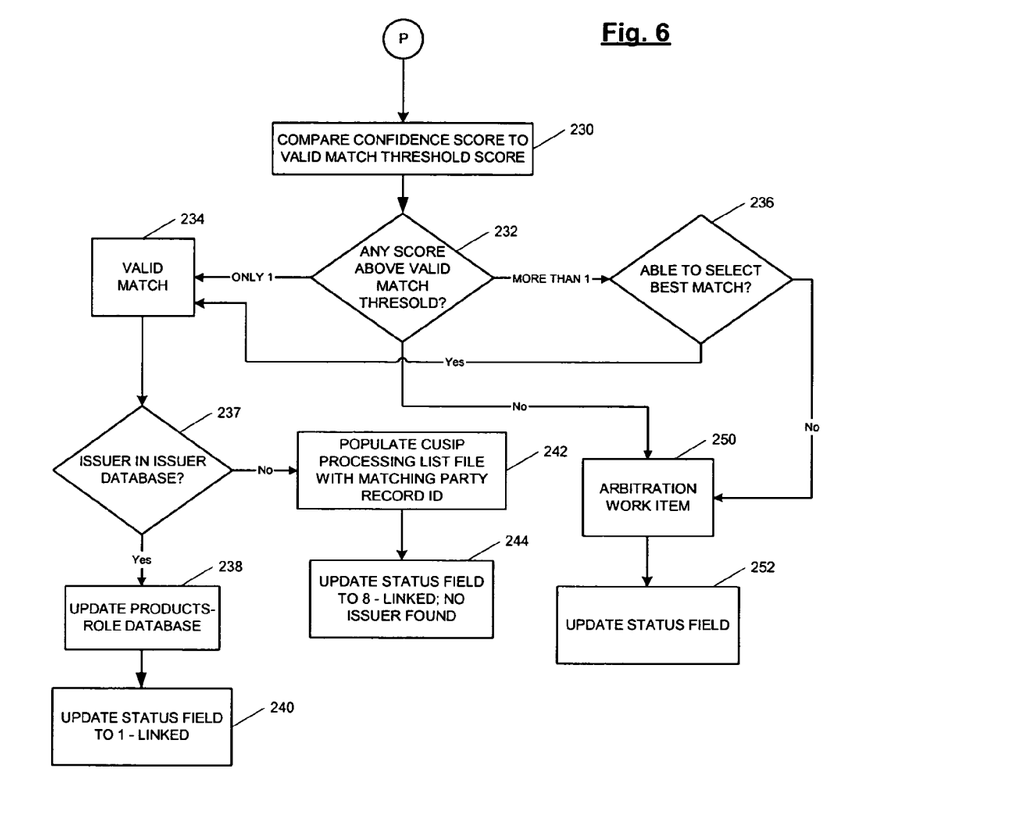

FIGS. 5 and 6 provide a flowchart of the process flow through the role linking system 18 for performing the matching (or linking) operation according to various embodiments of the present invention. For the sake of clarity, the flowcharts of FIGS. 5 and 6 only show the process for linking the issuer for the product to a party in the party database 105. The role linking system 18 may perform an analogous process to match other role players (such as guarantor or custodian) to party records in the party database.

With reference to FIG. 5, at step 200, when the CUSIP processing list file 16 is ready for processing, the role linking system 18 searches through the products database system 19 for issuer data for the identified products in the CUSIP processing list file 16. The role linking system 18 searches for the issuer data for any listed product that has a status of 5—New, 9—No product found, or 3—Reprocess. If the product identifier cannot be found in the products database system 19 at step 202, the role linking system 18 updates the issuer status field of the CUSIP processing list to 9—No Product Found at step 204.

If the product identifier is found in the issuer database at step 202, the process advances to step 206, where the role linking system examines the issuer data corresponding to the found product identifier. If an issuer is found at step 206, the process advances to step 208 where the role linking system 18 updates the issuer status field of the CUSIP processing list file 6—Issuer Found. If the issuer data is not found at step 206, the role linking system 18 updates the relevant status field to 7—Issuer Not Found, Product Found at step 210.

Returning to step 208, if the role data is found for a product and the status field is updated to 6—Issuer Found, the process may advance to step 212, where the role linking system 18 may extract relevant data from the products database 19, such as the issuer name, issuer country and issuer ID, and store it in the CUSIP processing list file 16. The role linking system 18 may then, at step 214, query the products-role database 104 to determine if the issuer ID has previously been linked to a party data record in the party database 105. If so, the process advances to step 216, where the role linking system 18 updates the status field to 1—Linked, and adds the party database ID and party name to the CUSIP processing list file 16 for the product. If the issuer ID has not been previously linked, the process advances to step 224, where a fuzzy logic match operation is performed. This operation is described further below.

Returning to step 210, if the status is updated to 7—Issuer Not Found, Product Found, the process may advance to step 220, where the role linking system 18 may trim and scrub the product description for the product listed in the CUSIP processing list file 16 to determine the issuer name for the product. That is, according to various embodiments, the role linking system 18 may parse and analyze the words of the product description to recognize the issuer name for the product.

For the products where the issuer ID was not linked (e.g., because no product identifier was found at step 202, no issuer was found at step 206, or the issuer ID was not previously linked at step 214), the process may advance to step 224, where the role linking system 18 may perform automated fuzzy match logic to match the issuer name to parties listed in the party database 105 for products where the issuer status is 6—Issuer Found, 7—Issuer Not Found, Product Found, or 9—No Product Found. The fuzzy match process may look for all matches having a confidence score above some minimum threshold, such as a confidence level or score of 70%.

As shown in FIG. 6, at step 230, the role linking system 18 compares the confidence score of the fuzzy match process to a predetermined valid match confidence score or threshold percentage (such as 91%). At step 232, the role linking system 18 determines if any fuzzy matches met or exceeded the threshold confidence score. If only 1, the process advances to step 234 where the match may be considered a valid match. If there is more than one match above the threshold valid match score, the following rules may be used at step 236 to select the best match:

1. select the match with the highest confidence score
2. if a tie, select the match based on headquarters location.

If a best match is selected at step 236 based on the applicable rules, the match is considered to be a valid match.

If the fuzzy match process yields a valid match and if, at step 237, it is determined that the product has an issuer ID in the products database system 19, the matching party record ID from the party database 105 and the issuer ID may be entered in the products-role database 104 at step 238. Also, at step 240, the status field in the CUSIP processing list file 16 for the product may be updated to 1—Linked.

If the matching process yields a single match but the product does not have an issuer ID in the issuer database 20, the matching party record ID from the party database 105 may be populated in the CUSIP processing list file 16 at step 242. The status field in the CUSIP processing list file 16 for the product may be updated to 8—Linked; No Issuer Found at step 244.

If at step 232 it is determined that none of the matches meet or exceed the valid match threshold level, the process advances to step 250 where an arbitration work item is created. Thus, an arbitration work item may be created where there is a fuzzy match at or above the minimum threshold confidence level (e.g., 70%) but below the valid match threshold confidence level (e.g., 91%). Also, an arbitration work item may be created if a valid match cannot be determined based on the applicable rules at decision step 236. In each of those cases, the fuzzy match operation will have returned potential matches. In that case, the issuer status field for the CUSIP processing list file 16 may be updated to 4—Arbitration. Also, an arbitration work item may be created where no matches above the minimum threshold confidence level (e.g., 70%) are returned. In that case, there are no potential matches and the issuer status field for the CUSIP processing list file 16 may be updated to 11—Arbitration; No Matches Found.

The arbitration work item may be listed in a work item table (not shown) that may be published to users or administrators of the system 10. For each arbitration work item in the work item table, the users and/or administrator may research the available data regarding the product and the issuer and select, in their opinion, the appropriate party from the party database 105. If the party database 105 does not list the appropriate issuer, the users and/or administrators may research the issuer and add the determined legal identity to the party database 105. Once the work item is completed, at step 252, the issuer status field may be updated as appropriate to either 1—Linked or 8—Linked; No Issuer Found, for example.

As part of the periodic linking process, the products database system 19 may be searched for issuer data by the users/administrator for any items having an issuer status identifier of 8—Linked, No Issuer Data in the CUSIP processing list file 16. If the issuer data is found, and it is already in the products-role database 104, the status field may be updated to 1—Linked. If the issuer data is found but it does not exist in the products-role database 104, the products-role database 104 may be updated to include the issuer data and the status field is updated to 1—Linked. The users/administrators may also update the CUSIP processing list file 16 to indicate the source of the updated issuer data. For example, various codes may be used to indicate research resources, such as data vendors and/or websites.

As mentioned above, the role linking system 18 may perform a similar linking process for other roles, such as guarantor and custodian. The various role linking processes may be performed in parallel by the role linking system or sequentially, according to various embodiments.

Once all the work items have been completed, any product where the issuer, guarantor and custodian status is 1—Linked, the product listing is preferably removed from the CUSIP processing list file 16. This may be done to reduce the number of products tracked in the CUSIP processing list file 16. Instead, using the products-role database 104, links may be determined and maintained using the role ID and may be available in the DRT 30.

According to various embodiments, a reconciliation process may be performed as part of the process of generating the DRT 30. As part of the reconciliation process, party information from the party database 105 is compared to the party information in the products-role database 104. If the party name or other data has changed, it is updated in the products-role database 104. Also, if the party no longer exists in the party database 105, the product may be tagged in the CUSIP processing list file 16 for reprocessing (e.g., status updated to 3) and links may be deleted from the CUSIP processing list file 16 and the products-role database 104.

The DRT 30 and work item lists may be displayed to users of the system 10 via web-based user interfaces, at the user terminal 34 according to various embodiments.

In the embodiments described above, the linkage information for the issuer, guarantor and custodian is stored in the products-role database 104. According to alternative embodiments, the system 100 may include, for example, a separate database for issuer linkage data, a separate database for guarantor linkage data, and a separate database for custodian linkage data, and so on. Also, the products-role database 104 may include one database for linkage data for equity products, and another database for linkage information for debt products.

Figure 7:
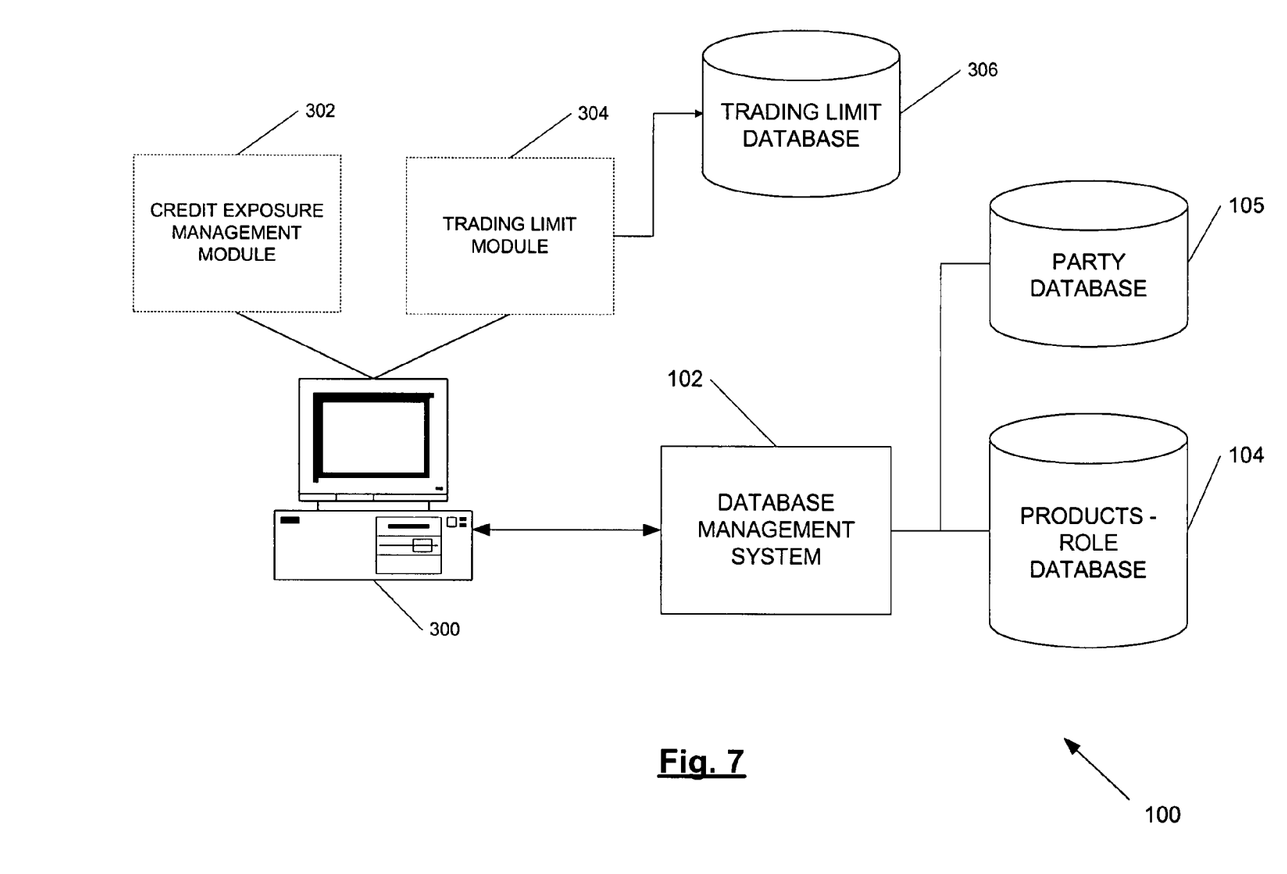
FIG. 7 is diagram of the computer system of FIG. 1 according to another embodiment of the present invention.

FIG. 7 is a diagram of the system 100 according to another embodiment of the present invention. In FIG. 7, a computer device 300 is shown in communication with the DBMS 102. The computer device 300 includes a credit exposure management module 302, which may be used by a firm to measure its credit exposure to a particular party or entity. The module 302 may be implemented as software code to be executed by a processor (not shown) of the computer device 300 using any suitable computer instruction type such as, for example, Java, C, C++, Visual Basic, Pascal, Fortran, SQL, etc., using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM or DVD-ROM.

In response to inputs, the credit exposure management module 302 may determine the credit exposure of the firm to a particular entity. The credit exposure management module 302 may interface with the DBMS 102 to determine, for example, the issuer and/or guarantor of products held by the firm, as recorded in the products-role database 104. Based on the links for the issuer and/or guarantor (or other credit-linked parties listed in the records 106 of the products-role database 104) to the corresponding party data records in the party database 105, the credit exposure management module 302 may determine, e.g., the ultimate legal parent and/or the ultimate credit parent for the parties performing credit risk-exposing roles for the products. The credit exposure management module may then sum, or "roll-up", the total exposure of the firm to the ultimate legal parents and/or ultimate credit parents for the products to measure the credit exposure of the firm to those parties.

Thus, when a significant event occurs, such as a company declaring bankruptcy, the system 100 can be used to not only determine all of the products issued by the company or its subsidiaries, but also what parties are the guarantors and custodians for those products. Such information may be valuable in calculating exposure for various parties, for example. The inputs to the credit exposure management module 302 as far as which parties to assess the credit exposure of the firm may be input to the computer device 300 via a user using conventional user input devices (e.g., keyboard, mouse, etc.), or the inputs may be in a file downloaded to the computer device 300 via conventional file transfer mechanisms, for example.

As shown in FIG. 7, the computer device 300 may also include a trading limit module 304. The trading limit module 304 may compare the exposure of the firm to a particular party (as determined by the credit exposure management module 302), or for a group of parties satisfying some criteria (such as belonging to a particular sector and/or region). That is, for example, a firm can put trading limits on a primary party, and these trading limits may be stored in a database 306 accessible by the trading limit module 304. The trading limit module 304 can compare the cumulative exposure to the primary party, as determined by the credit exposure management module 302, to the trading limit. The limits may be, for example, single name limits on parties, such as a limit of $X for all parties meeting certain criteria. The criteria may be, for example, parties having a credit spread greater than a certain value, the maturity of debt securities, the ratings of debt securities, industry sectors, geographic regions, etc. Also, cumulative limits on groups of parties may be used, such as a limit of $Y on all products meeting some criteria (e.g., guaranteed by the government of a particular country, a certain rating, a certain maturity range, etc.). The output of the comparisons may then be provided, for example, in a user interface displayed on a monitor of the computer device 300, or the output may be stored in a file and transferred to a remote user via a data communication network, for example.

The trading limit module 304, like the credit exposure management module 302, may be implemented as software code to be executed by a processor (not shown) of the computer device 300 using any suitable computer instruction type such as, for example, Java, C, C++, Visual Basic, Pascal, Fortran, SQL, etc., using, for example, conventional or object-oriented techniques. The software code may be stored as a series of instructions or commands on a computer readable medium, such as a random access memory (RAM), a read only memory (ROM), a magnetic medium such as a hard-drive or a floppy disk, or an optical medium such as a CD-ROM or DVD-ROM. The computer device 300 is shown in FIG. 7 as a PC, although it should be recognized that the computer device 300 may be implemented with other types of computer device, such as a laptop, a workstation, a server, etc., or as a network of such computing devices.

While several embodiments of the invention have been described, it should be apparent, however, that various modifications, alterations and adaptations to those embodiments may occur to persons skilled in the art with the attainment of some or all of the advantages of the present invention. For example, various steps of the processes described herein may be performed in separate orders. It is therefore intended to cover all such modifications, alterations and adaptations without departing from the scope and spirit of the present invention as defined by the appended claims.

What is claimed is:

1. A computer system for assessing credit exposure utilizing a products-role database, the computer system comprising:
   a party database comprising a plurality of party data records, each of the party data records having party data fields that contain information about one of a plurality of parties, wherein the party data fields comprise data fields for legal name and address, wherein each of the party data records further comprises a hierarchical relationship data field that enables linking to another party data record to operatively enable the creation of a parent-subsidiary relationship between the parties;
   a products-role database comprising a plurality of product-roles records that are associated with a set of issued securities, wherein each of the plurality of product-roles records includes a product identifier field for storing data indicating a security in the set of issued securities and a plurality of role-player data fields for identifiers to identify parties that perform at least two separate roles with respect to the indicated security in the set of issued securities, wherein the role-player data fields comprise an issuer name field for storing data indicating an issuer of the indicated security, one or more fields indicating an issuer identifier and a unique record identifier for linking to the issuer in the party database, and one or more fields indicating a guarantor identifier and a unique record identifier for linking to the guarantor in the party database;
   a computerized role-linking system in communication with the party database, the products-role database, and a source of security identifiers and corresponding role-player identifier data, wherein the source of the role-player identifier data is susceptible to using different identifiers for the same party, and wherein the role-linking system is programmed to:
      receive a security identifier from an inventory file, wherein the security identifier identifies an issued security held by a first party;
      determine a role-player identifier data associated with the security identifier, wherein the role-player identifier data indicates a party that performs, with respect to the issued security, the role of one of issuer and guarantor;
      when the role-player identifier data, regarding the party that performs the role of one of issuer and guarantor, is determined, querying the products-role database to determine whether the party is linked to a party data record in the party database; and
      when the party is not linked to a party data record in the party database, matching the role-player identifier data to a party data record in the party database and updating the products-role database to create a linkage; and
   a computer device in communication with the products-role database, wherein the computer device is programmed to determine an aggregate credit exposure of the first party to a second party, wherein the determination is based on data in the products-role database.

2. The system of claim 1, wherein the role-player data fields further comprise one or more fields indicating a custodian identifier and a unique record identifier for linking to the custodian in the party database.

3. The system of claim 2, wherein the set of issued securities comprise debt securities.

4. The system of claim 1, wherein the product, roles records include products identifiers for the first set of issued securities that are related to the CUSIP number for the set of issued securities.

5. The system of claim 1, further comprising a database management system in communication with the party database and the product-roles database.

6. The system of claim 1, wherein the computer device is further programmed to compare the aggregate credit exposure to the second party to a trading limit.

7. The system of claim 1, wherein the role-linking system is programmed to use a fuzzy logic match to match the role-player identifier data to the party data record in the party database.

* * * * *